United States Patent
Brengel et al.

(10) Patent No.: US 7,427,339 B2
(45) Date of Patent: Sep. 23, 2008

(54) HEAT CONDUCTING METAL LAYER FOR ION CONDUCTOR STACK

(75) Inventors: David Douglas Brengel, Schnecksville, PA (US); Donald Laurence Meixner, Camarillo, CA (US); Brett Tamatea Henderson, Salt Lake City, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 607 days.

(21) Appl. No.: 10/966,597

(22) Filed: Oct. 15, 2004

(65) Prior Publication Data
US 2006/0083974 A1    Apr. 20, 2006

(51) Int. Cl.
C25B 9/00   (2006.01)
C25C 7/00   (2006.01)
C25D 17/00  (2006.01)

(52) U.S. Cl. .......................... 204/270; 204/242; 204/278

(58) Field of Classification Search ................. 204/242, 204/270, 278
See application file for complete search history.

(56) References Cited

U.S. PATENT DOCUMENTS

| | | |
|---|---|---|
| 4,885,142 A | 12/1989 | Suitor et al. |
| 5,186,806 A | 2/1993 | Clark et al. |
| 5,298,138 A | 3/1994 | Nachles et al. |
| 5,750,279 A | 5/1998 | Carolan et al. |
| 5,868,918 A | 2/1999 | Adler et al. |
| 6,042,703 A | 3/2000 | Adler et al. |
| 6,090,265 A | 7/2000 | Adler et al. |
| 6,117,288 A | 9/2000 | Adler et al. |
| 6,132,573 A | 10/2000 | Cubukcu et al. |
| 2003/0022048 A1 | 1/2003 | Meixner |
| 2004/0038111 A1 * | 2/2004 | Eddy et al. .................... 429/38 |

FOREIGN PATENT DOCUMENTS

| | | |
|---|---|---|
| EP | 0 565 790 A1 | 10/1993 |
| EP | 0 682 379 B1 | 3/1999 |
| EP | 0 983 786 A2 | 3/2000 |
| WO | 92/00934 A | 1/1992 |
| WO | WO 0076015 A1 * | 12/2000 |
| WO | 02/089243 A2 | 11/2002 |

* cited by examiner

Primary Examiner—Gregg Cantelmo
Assistant Examiner—Eugenia Wang
(74) Attorney, Agent, or Firm—Keith D. Gourley; Bryan C. Hoke, Jr.

(57) ABSTRACT

The current invention relates to a means for improving heat removal from the inside of an electrochemical device to the outer surface so as to reduce thermal stresses in the device, thereby allowing for increased oxygen production. A means for conducting heat toward the outer edge is provided. The means for conducting heat comprises at least one of silver, gold, platinum, rhodium, and palladium.

7 Claims, 7 Drawing Sheets

HEAT CONDUCTING METAL LAYER FOR ION CONDUCTOR STACK

STATEMENT REGARDING FEDERALLY SPONSORED RESEARCH OR DEVELOPMENT

This invention was made with Government support under F41624-00-C-6000 awarded by U.S. Department of the Air Force. The Government has certain rights in the invention.

BACKGROUND OF THE INVENTION

The present invention relates to an electrochemical device for the recovery of oxygen from an oxygen-containing gas, and in particular to an improved interconnect and stack design for reducing thermal gradients.

Dense solid electrolyte membranes formed from certain classes of multicomponent metallic oxides, do not possess connected through porosity and transport oxygen ions at elevated temperatures upon application of an electric potential gradient across such dense membrane. These devices are referred to as electrically driven solid electrolyte oxygen separation (SEOS) devices.

Each electrochemical cell comprises a dense solid electrolyte membrane formed from an oxygen ion conducting multicomponent metallic oxide, an anode and a cathode. Two or more of such electrochemical cells are connected in series by interconnects which are formed from electron-conducting multicomponent metallic oxides, thereby forming an electrochemical device. An interconnect is defined as an element that connects an anode and cathode of adjacent electrochemical cells to establish an electrical connection in series between such adjacent electrochemical cells. The side of the interconnect facing the anode of a solid electrolyte when placed in use is defined as the anode side and the side of the interconnect facing the cathode of a solid electrolyte when placed in use is defined as the cathode side. The interconnects are electrically-conductive. Electrically conductive means that electrons are conducted through the material with little or no resistance. As described below, a current collector may also be used on the anode and cathode to ensure good electrical distribution across the surface area of the electrochemical cell. As a result, a current collector may be disposed between the cathode side of the interconnect and the cathode and/or a current collector may be disposed between the anode side of the interconnect and the anode. Further, the interconnects have no connected through porosity.

The above electrochemical cells can be constructed in tubular, flat plate and honeycomb configurations. The flat plate configuration is preferred for several reasons, one of which is that it allows for several electrochemical cells comprising the solid electrolyte membranes to be connected in a stack. In such a stack, a plurality of electrochemical cells comprising the dense solid electrolyte membranes are combined (or stacked) to operate in electrical series. This in turn increases the efficiency of the device. The flat plate design is also favored for ease of assembly and compact dimensions.

The stack may optionally include a support member and anode and cathode seals. The stack of these electrochemical cells may be placed between an anode and a cathode connection on respective end plates and may be housed in a shell providing for manifolds, heating, etc.

Representative structures are disclosed in U.S. Pat. Nos. 6,117,288, 6,090,265, 6,042,703, 5,868,918, all assigned to Air Products and Chemicals, Inc., incorporated herein by reference and U.S. Pat. Nos. 4,885,142; 5,186,806; 5,298,138 and European Patents Nos. 0 682 379 and 0 983 786.

The overall assembly and operation of the electrochemical cell stack is illustrated by the schematic isometric view of FIG. 1, which is not to scale. The cell stack is formed by a series of alternating solid electrolytes 95 with appropriate anodes and cathodes (not shown), interconnects 97 and insulating support material 99 with negative end plate 101 and positive end plate 103. Positive and negative electrical connections provide direct current to the stack, which operates at about 50 to 700 mV per cell. An exemplary device is disclosed in U.S. Pat. No. 6,042,703 assigned to Air Products and Chemicals, Inc., which document is incorporated herein by reference.

In this embodiment the electrolytes are planar and are stacked in the axial direction. The stack shape of each plate in radial direction from a central opening can be formed from a variety of shapes including circular, square, rectangular or any other planar geometrical shape as required by the specific application. The preferred electrolyte plate and interconnect are, generally square with rounded corners as shown in FIG. 1. Although this figure is not to scale, it can be seen that the solid electrolyte plates 95 are depicted as comparatively thin (in practice about 250 µm) as compared to the interconnects 97 that in general have a thickness about ten times the thickness of the solid electrolyte (in practice about 2500 µm).

Oxygen-containing feed gas flows into one side of the stack as shown, flows across the cathode sides of the cells in a cross flow mode, and the oxygen-depleted gas exits the opposite side of the stack. The insulating supports 99 on the opposite sides of the stack direct gas in a cross flow mode through formation of suitable barriers and passages. A section through the stack shows the radial flow of oxygen product gas across the anode side of an interconnect toward the central opening 109. The central openings through the electrolyte plates and interconnects, in conjunction with cathode seals, form a central conduit in gas flow communication with the anode side of each cell. The central conduit connects with oxygen withdrawal conduit 111 which in turn is connected with a gas-tight seal (not shown) to bottom or positive end plate 103. Alternatively, an oxygen withdrawal conduit (not shown) could be connected at negative end plate 101. If desired, oxygen product can be withdrawn from both ends of the stack (not shown).

The above electrochemical cell stack and the solid-state device can be fabricated by methods known in the art of ion conducting ceramics. The device can be made from any materials known in the art and generally used as solid electrolytes/membranes, electrodes, interconnects, and seals.

An exploded, partial sectional view of the solid-state device is illustrated in FIG. 2, based on the disclosure of U.S. Pat. No. 6,042,703 relating to flat plate designs of oxygen pumps in general. A single electrochemical cell is formed by an electrolyte membrane 29 having an anode 33 and a cathode 31, and the adjacent surfaces of two interconnects 35 and 37 joined by the appropriate gas-tight anode seal 39 and cathode seal 45 and electrical connections.

Optionally an electrically insulating support is disposed between the cathode side of electrolyte plate 29 and the cathode side of interconnect 35 and a portion of this support is denoted as support 51. This support eliminates damaging stresses on electrolyte plate 29 when the gas pressure on the anode side of the electrochemical cell is greater than the gas pressure on the cathode side of the cell. Support 51 may or may not be gas tight, and is not applied continuously as explained in U.S. Pat. No. 6,042,703.

Electrochemical cell stacks comprise a plurality of solid electrolyte membranes 29 having anode and cathode sides, said electrolytes being about 5 μm to 1 mm thick. The membranes may be formed from any suitable material known in the art.

Anode layers 33 are formed on the anode side of the electrolytes of the cells and cathode layers 31 are formed on the cathode side of the electrolyte of the cells. The anode layers and the cathode layers may be formed from any oxidation resistant material, an alloy or a multicomponent mixed conducting oxide as known in the art. Both layers are typically applied independently in the form of a coating to the respective surface and can be attached e.g. by sintering of a paste applied by screen printing, sputtering, painting etc. The electrode thicknesses are typically in the range of 0.1 to 100 μm.

As illustrated by FIG. 2, showing a partial view in cross section, the anode side of the interconnect 37 faces an anode layer 33. The cathode side of the interconnect 35 faces a cathode layer 31. The outer edge of interconnect 35 is denoted by the numeral 11. The outer edge 11, translocated about the outer periphery of the interconnect forms the outer surface of the interconnect. Optionally, a current conductor (not shown), an electrically conductive material, may be formed on the anode and cathode such that it is between the anode 33 and the interconnect 37 and the cathode 31 and the interconnect 35, discussed further below.

The interconnect is generally planar, gas impermeable, ionically non-conductive, and electrically conductive. The interconnect is prepared by conventional ceramic techniques known in the art. Sintering temperatures and procedures should be selected such that the sintered interconnect is free of connected through porosity, i.e. the network of pores do not allow flow of gases through the interconnect. The interconnect should have a final density of above 95% of theoretical density, preferably about 97% of theoretical density and more preferably of about 99% of theoretical density. Sintering temperatures of the interconnect are typically below 1350° C., preferably below 1300° C.

The interconnects may be stackfired, hangfired, or fired by use of any other means to minimize interaction of the composition of matter or interconnect with a setter or form. Any suitable setter known in the art may be used. In any case it is desired to prevent sticking between the setter and the interconnect. Further, any reaction between the interconnect and the setter which results in warping or deformation of the interconnect or its surface should be avoided. Preferably, sintering conditions and lack of interactions would allow reuse of setters in interconnect production.

The cathode side of an interconnect 1 is shown in plan view in FIG. 3, wherein the interconnect has a continuous peripheral flat surface 17 adjacent to the outer surface 15 and an opening 19 proximate the center of the interconnect. The interconnect generally has the same shape and size as the electrolyte plates. A continuous generally flat surface 21 surrounds opening 19. Opening 19 typically is the same or similar diameter as the openings in the electrolyte plates. A plurality of raised areas 23, characterized in this embodiment as frustoconical bosses or as spherical segments with flattened tops, which also may be described as pins, are disposed between flat regions 17 and 21. A so-called pin region is thereby disposed between the peripheral flat surface 17 and the flat center surface 21. The continuous depressed or non-raised areas between the raised areas in conjunction with an adjacent electrolyte plate form a cavity in flow communication with peripheral flat surface 17 as described below. Alternatives to raised areas 23 can be used, such as ribs, raised rectangular or triangular areas, and the like, which perform essentially the same function as raised areas 23. The tops of raised areas 23 and flat region 21 are generally coplanar, and this plane is above the plane formed by flat region 17.

The opposite or anode side of the interconnect 1 is shown in plan view in FIG. 4. A continuous peripheral flat surface 25 is disposed adjacent the outer surface 15 of the interconnect, and a plurality of raised areas 27, characterized in this embodiment as frustoconical bosses or spherical segments with flattened tops, which also may be described as pins, are disposed between generally flat region 25 and opening 19. The continuous depressed or non-raised areas between the raised areas in conjunction with an adjacent electrolyte plate form a cavity or interconnected cavities in flow communication with opening 19. Alternatives to raised areas 27 can be used, such as ribs, channels, and the like, which perform essentially the same function as raised areas 27. Continuous grounding rib 28 surrounds the raised areas and electrically contacts a biasing electrode. The tops of raised areas 27, the top of grounding rib 28, and flat region 25 are generally coplanar.

As discussed in U.S. Pat. No. 6,042,703, an electrically conducting material, is applied to the surfaces of the raised areas on each interconnect as defined by elements 23 of FIG. 3 and 27 of FIG. 4. When the stack is fired, this conducting material bonds to the raised areas on the interconnects and to the electrodes on each electrolyte plate. These so-called conformal layers provide operative electrical connections between the electrodes and the adjacent interconnects, and also provide mechanical support for the electrolyte plate. The conducting material is preferably silver initially applied as an ink before firing. As the conformal layers at each pin are not thermally connected, they are not effective to transfer heat to the outer surface of the stack. Further, this conformal layer does not extend into the flat peripheral region of the interconnect and do not provide heat dissipation toward the outer edge of the interconnect.

As discussed in U.S. Pat. No. 5,298,138, an electrically conductive current collecting material may be applied to the electrode (anode and/or cathode) surface to distribute an electromotive force over the surface area of the electrode. The current collecting material is preferably a noble metal such as silver, a silver alloy, or platinum, and is applied to the electroded surface in a grid pattern. Since the current collector is less permeable to gas molecules, the grid pattern distributes the electromotive force over the surface of the electrode, yet leaves the majority of electrode surface area available for passage of gas molecules. The grid pattern also produces low sheet resistance to current passing through the current collector. In a preferred application method, the current collector is screenprinted onto the electrode surface. Other methods such as painting may be utilized to apply the current collector to the electrode surface.

In the article "Three-dimensional numerical modeling of heat and mass transfer in a ceramic oxygen generator (COG)" by Lau et al. (Numerical Heat Transfer, Part A, 41:149-164, 2002), describes a model and the impact of current collectors on temperature gradients. Silver mesh current collectors, which have high thermal and electrical conductivity, are screen printed across the surface of the electrodes to provide uniform potential distribution across the cell. The silver mesh current collectors were shown to reduce temperature gradients in the stack.

In Examples 5 and 6 of U.S. Pat. No. 6,117,288, current collectors were also used. A porous silver layer was applied over the electrode to act as a current collector.

Current collectors are contiguous with the electrodes and since the electrodes do not extend to the edges of the electrolyte, the current collectors do not extend past the outer edge of the electrodes.

The interconnects of these subject devices fulfill several roles. The interconnect may provide some or all of the following roles: (1) provides for separation of gas passages between anode and cathode sides of adjacent electrolyte plates, (2) provides the channels by which feed and product gas streams are manifolded, (3) acts as an electron conductor to connect the solid electrochemical cells in series, (4) prevents back diffusion of oxygen from the product stream to the feed stream, and (5) in many cases due to the relative thickness of the components, the interconnect provides additional mechanical support to the stack.

Interconnects are formed from electrically conductive materials which are non-ionically conductive. Non-ionically conductive means that the ion conductivity, particularly the oxygen ion conductivity, is less than $10^{-2}$ Siemens/cm under operating conditions. Such interconnects must be sufficiently compatible with other device materials so that the interconnect should not adversely react with other components to form products which negatively impact device performance or lifetime. The interconnects should possess a coefficient of thermal expansion that matches other device materials, and have sufficient mechanical stability to withstand the prevailing pressure difference within each electrochemical cell. The interconnect material should be stable at the conditions prevailing at the anode and cathode side of the solid electrolyte membrane. The interconnect should be of sufficient strength to mechanically stabilize the stack.

Further, the interconnect material should be formed from a composition of matter that will not deform or distort upon either assembly or use of the device. When the above material demands are combined, the number of candidate materials for making the interconnects is severely limited.

Stoichiometric lanthanum strontium manganite represents a commonly used interconnect composition. U.S. Pat. No. 5,750,279 discloses a series planar design for solid electrolyte oxygen pumps. This patent lists a number of candidate stoichiometric compositions for interconnects including lanthanum strontium manganite, lanthanum strontium chromite, lanthanum calcium manganite, and lanthanum calcium chromite. (see also, U.S. Pat. No. 5,868,918). U.S. patent application Ser. No. 2003/0022048 discloses other suitable compositions of matter for the interconnect.

These interconnect materials are electrically conductive but generally have low thermal conductivities. As electric current passes through the stack, heat is generated within the dense solid electrolyte. Heat is removed by the air passing through the stack and by conduction through the ceramic parts to the outer surfaces of the stack (sides, top, and bottom). Neither of these heat removal pathways are particularity effective. The air mass flow is low leading to a small heat capacity capability and the ceramic materials have low thermal conductivities. Thus, the heat generated by the power dissipation give rise to temperature gradients in both the planar and axial directions within the stack in order to provide the necessary driving force to remove the heat from the stack. These temperature gradients create thermal stress with the various ceramic components that comprise the stack. As the current is increased to increase oxygen production, the heat generated by the power dissipation increases and the temperature gradients increase in the stack creating additional thermal stresses in the stack. If the thermal stresses reach a critical value, they can lead to failure of the dense solid electrolyte membrane or even the interconnect. The oxygen production capacity is thereby limited due to thermal stresses in the stack caused by temperature gradients. There is therefore a need to decrease temperature gradients in the stack in order to increase efficiency and productivity of the device.

BRIEF SUMMARY OF THE INVENTION

This object is solved by the addition of a means for conducting heat toward, i.e. in the direction of, the outer edge of the interconnect. The means for conducting heat is between the outer edge of the interconnect and at least one of the edges of the adjoining electrodes. The means for conducting heat comprises any high thermal conductivity metal or alloy that is compatible with the operating conditions and materials of the stack, for example, at least one metal selected from the group consisting of silver, gold, platinum, rhodium, and palladium. The means for conducting heat preferably comprises silver.

One means for conducting heat is a layer contiguous with at least a portion of at least one of the anode side or the cathode side of the interconnect wherein the layer is between the outer edge of the interconnect and at least one of the edges of the adjoining electrodes. Another means is a layer wherein the layer resides within the interconnect and the layer is between the outer edge of the interconnect and at least one of the edges of the adjoining electrodes. A layer is defined herein to include continuous structures such as coatings or sheets, or discontinuous structures such as ribbons, strips, bands, rods, bars, fibers, strands, filaments, wires, and the like.

As a layer on the surface, the means for conducting heat can be formed by spraying or brushing a metal-containing slurry on the at least one surface of the interconnect and evaporating the solvent leaving a layer of metal, or by contacting a metal containing foil to the at least one side of the interconnect with or without adhesive means. Preferably the layer is proximate with at least a part of the outer surface of the interconnect. The heat transfer layer covers, or is contiguous with, at least enough of the surface of the interconnect to effect a measurable heat transfer benefit. One skilled in the art can easily detect whether or not such benefit is achieved. Preferably, the layer covers nearly all of at least one surface of the interconnect, excluding the surface contiguous with the anode or cathode seal.

As a layer within the interconnect, the means for conducting heat can resemble a composite or laminate structure. The composite or laminate structure can be created during the fabrication of the interconnect.

It is important for the means for conducting heat to provide heat communication from within the stack to the outer surface of the stack. It is therefore preferable for the means for conducting heat to be present near the outer edge of the interconnect to prevent a thermally insulating zone at the outer edges of the stack.

DETAILED DESCRIPTION OF THE INVENTION

As set forth above, the present invention relates to an electrochemical device with a means for conducting heat toward the outer edge of the interconnect comprising at least one metal having a high thermal conductivity selected from the group consisting of silver, gold, platinum, rhodium, and palladium. Preferably, the means for conducting heat consists essentially of a metal selected from the group consisting of silver, gold, platinum, rhodium, palladium, and mixtures thereof. The means for conducting heat more preferably consists essentially of silver. A metal as defined herein can be an elemental metal but also includes metallic mixtures, metallic alloys, oxide phases, and mixtures thereof.

The electrochemical device according to the invention includes a means for conducting heat. The means for conducting heat can be described as being provided between the outer edge of the interconnect and at least one of the outer edge of the anode and the outer edge of the cathode. Indicating that the means for conducting heat is between the edges means that a straight line from one edge to the other edge can be drawn through or to intersect with the means for conducting heat. The means for conducting heat comprises at least one metal selected from the group consisting of silver, gold, platinum, rhodium, and palladium. The means for conducting heat can be a layer on the cathode side or the anode side of the interconnect, or within the interconnect. The layer may or may not be continuous and may or may not extend all the way to the outer edge of the interconnect.

Figure 1:
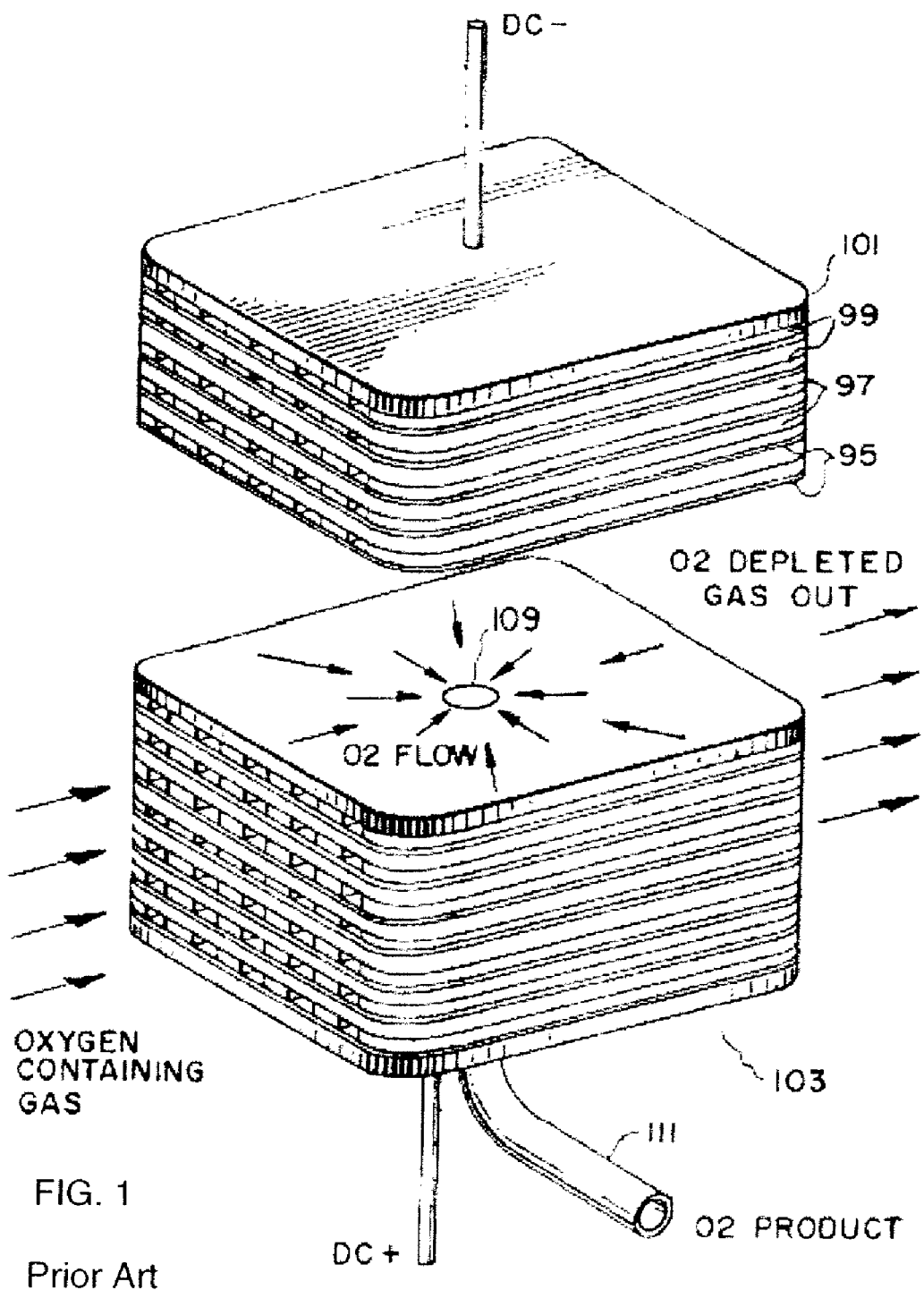
FIG. 1 is a schematic isometric view of a complete electrolyte stack.
Figure 2:
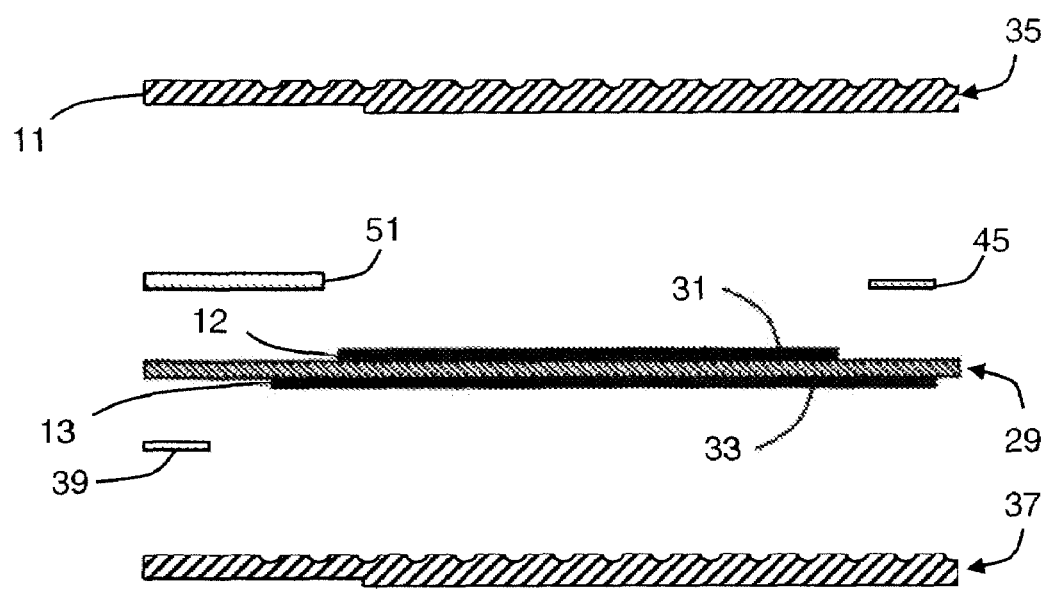
FIG. 2 is an exploded partial cross section view of two electrolyte plates and one interconnect.
Figure 3:
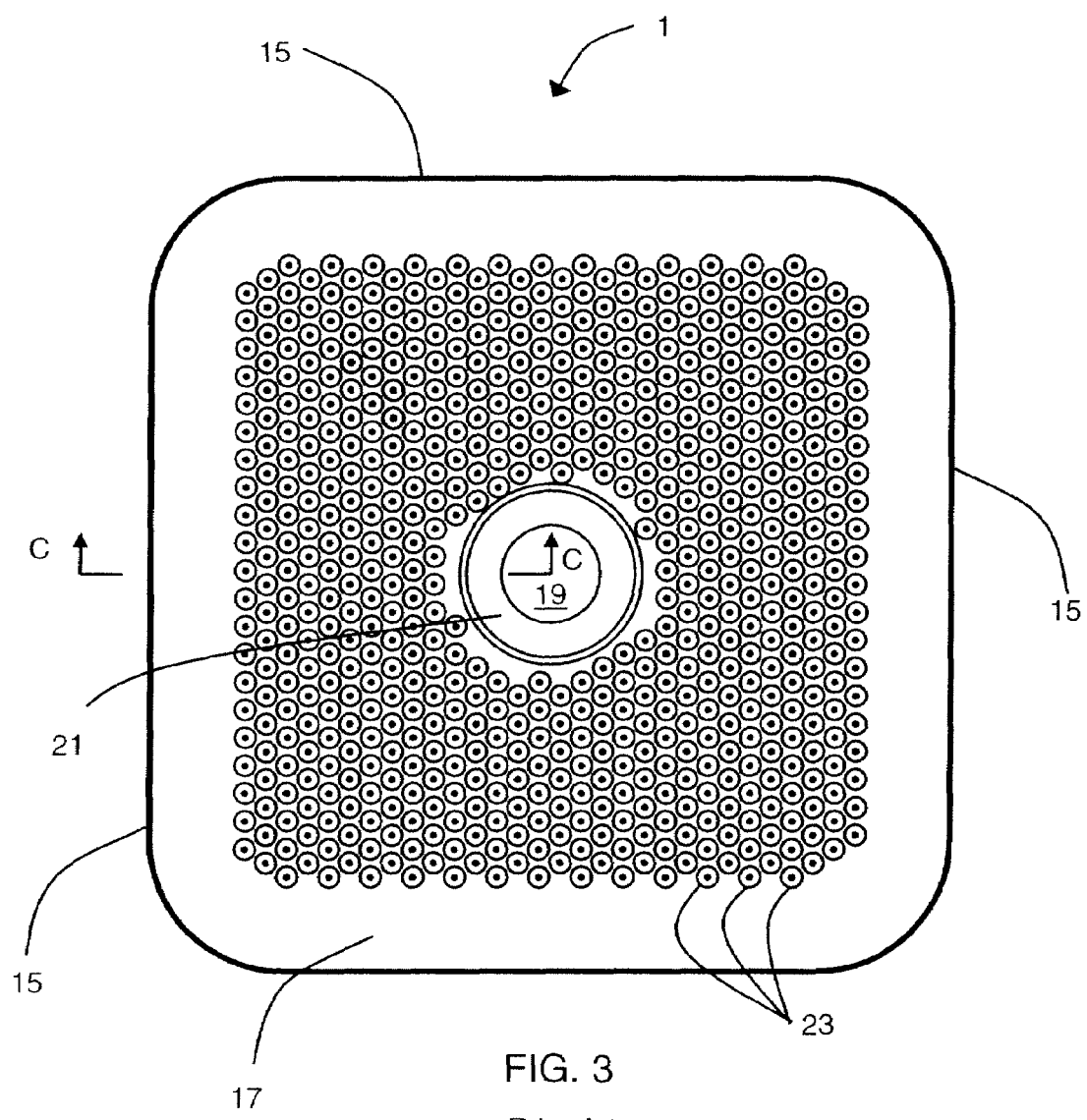
FIG. 3 shows the cathode side of an interconnect.
Figure 4:
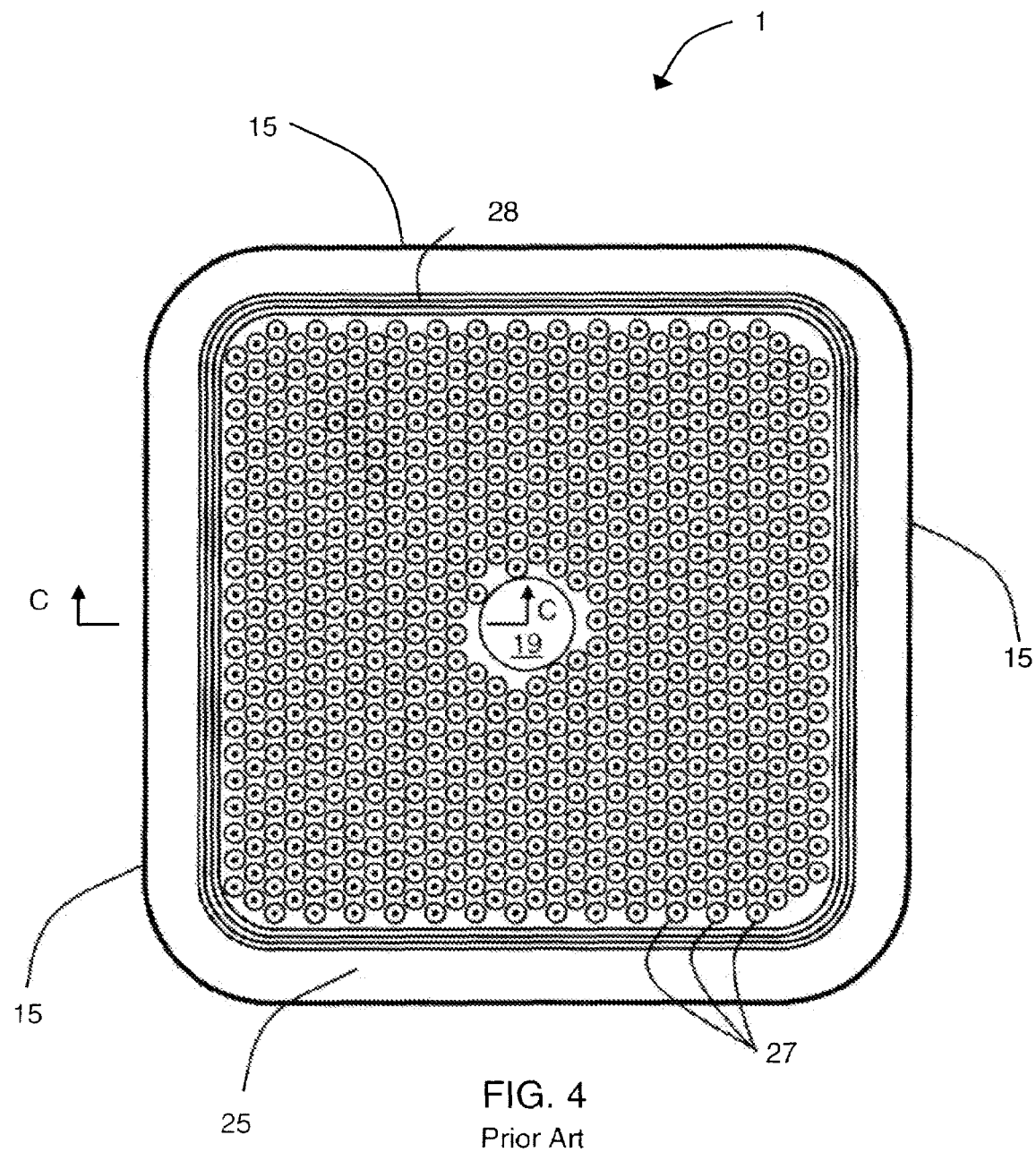
FIG. 4 shows the anode side of an interconnect.
Figure 5:
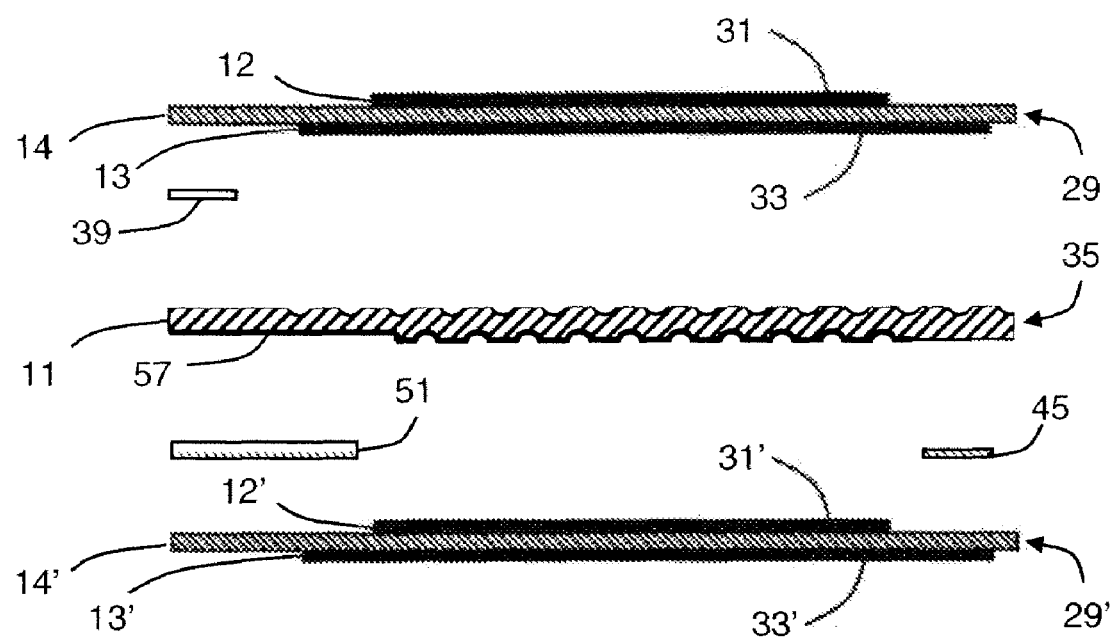
FIG. 5 is an exploded partial cross section view of a first embodiment of the current invention including an interconnect and two solid electrolytes.

One embodiment of the current invention is illustrated in FIG. 5. The electrochemical device comprises (a) a first solid electrolyte 29 having an anode side, a cathode side, and an outer edge 14, (b) a first anode 33 situated adjacent to the anode side of the first solid electrolyte 29, the first anode having an outer edge 13 wherein the outer edge 13 is offset from the outer edge 14 of the first solid electrolyte 29, (c) a first cathode 31 situated adjacent to the cathode side of the first solid electrolyte 29, the first cathode 31 having an outer edge 12, wherein the outer edge 12 is offset from the outer edge 14 of the first solid electrolyte 29, (d) a second solid electrolyte 29' having an anode side, a cathode side, and an outer edge 14', (e) a second anode 33' situated adjacent to the anode side of the second solid electrolyte 29', the second anode having an outer edge 13' wherein the outer edge 13' is offset from the outer edge 14' of the second solid electrolyte 29', (f) a second cathode 31' situated adjacent to the cathode side of the second solide electrolyte 29', the second cathode 31' having an outer edge 12', wherein the outer edge 12' is offset from the outer edge 14' of the second solid electrolyte 29', (g) an electrically-conductive, non-ionically conductive interconnect 35 having no connected through porosity situated between said first solid electrolyte 29 and said second solid electrolyte 29', said interconnect 35 having an outer edge 11, and (h) a means for conducting heat 57, said means for conducting heat located between the outer edge 11 of the interconnect 35 and at least one of the outer edge 13 of the first anode 33, the outer edge 12 of the first cathode 31, the outer edge 13' of the second anode 33', and the outer edge 12' of the second cathode 31', said means for conducting heat comprising at least one metal selected from the group consisting of silver, gold, platinum, rhodium, palladium. Preferably, the means for conducting heat consists essentially of a metal selected from the group consisting of silver, gold, platinum, rhodium, palladium, and mixtures thereof. The means for conducting heat more preferably consists essentially of silver. The means for conducting heat or layer material is selected based on oxidation resistance, cost, and melting point.

The thermal conductivity of the heat transfer layer is much higher than the multicomponent metal oxide interconnect material. While the multicomponent metal oxide interconnect material generally has a thermal conductivity of roughly 3 W/mK, silver, gold, platinum, rhodium, and palladium have thermal conductivities of about 428, 318, 71.1, 150, and 70 W/mK, respectively.

In the embodiment illustrated in FIG. 5, the means for conducting heat 57 toward the outer edge 11 is applied to the interconnect 35 as a layer contiguous with at least a portion of the cathode side of the interconnect. The outer edge of the cathode 31' is denoted 12' and the outer edge of the anode 33' is denoted 13'. This embodiment clearly shows the means for conducting heat between the outer edge of the cathode 12' and the outer edge 11 of the interconnect 35. Also, it is clear (bearing in mind that FIG. 5 is an exploded view) that it is possible to draw a straight line from the outer edge 12' of the cathode 31' to the outer edge 11 of the interconnect 35 where the line passes through or intersects with the means for conducting heat 57.

Although shown on the cathode side of the interconnect, the layer can also be applied to the anode side of the interconnect. In this case the means for conducting heat is between the outer edge 13 of the anode 33 and the outer edge 11 of the interconnect 35. It is possible to draw a straight line from the outer edge 13 of the anode 33 to the outer edge 11 of the interconnect 35 where the line passes through or intersects with the means for conducting heat.

In this embodiment, the layer is shown contiguous with the peripheral flat surface of the interconnect. Greater benefit is provided when the heat transfer layer provides heat communication from within the stack to the outer surface of the stack for heat removal. It is therefore preferable for the heat transfer layer to cover at least a portion of and more preferably all of the outer, peripheral flat surface of the interconnect to prevent a thermally insulating zone near the outer edges of the stack. Most preferably, the layer covers largely all, greater than 75%, of the surface of the interconnect as shown in FIG. 5. Preferably, the means for conducting heat does not extend in the small region adjacent to the cathode seal 45. A heat transfer layer contiguous with the cathode seal may weaken the seal and oxygen may diffuse through the layer.

Any amount of metal sufficient to provide a measurable effect in increased heat transfer toward the edge of the interconnect decreases thermal stresses and probability for failure, with thicker layers providing more benefit than thin layers. The upper limit depends on several potential factors such as the ability to prevent spalling, the cost of the metal, or the impact on gas flow path dimensions.

The means for conducting heat can be formed as a layer by spraying or brushing a metal-containing slurry on the at least one surface of the interconnect and evaporating the solvent leaving a layer of metal, or by contacting a metal containing foil to the at least one side of the interconnect with or without adhesive. Preferably the heat transfer layer is applied by spraying means.

For the case of preparing a heat transfer layer comprising silver, an ink is first prepared. The ink comprises silver powder having an average particle size of about 3 mils (0.003 inches), cyanoguanidine, oleic acid, terpineol, and V-006 (a mixture of terpineol and resin available from Heraeus), having mass percentages of about 79.5, 0.5, 0.5, 11.8, 7.7, respectively. This ink is mixed and then thinned with 2-propanol before spraying on the surface of the interconnect. The thinned mixture is about 88.9 mass percent ink with the balance 2-propanol. Silver-containing inks/pastes are also commercially available such as Heraeus CL80-8487, Metech PCC11902, Dupont 7342, and ESL Electro-Science 9990.

The heat transfer layer is applied to the interconnect using a low volume low pressure spray valve, such as manufactured by EFD, Inc. The spray valve provides a fan pattern that spreads about 6.5 inches long and 0.5-1 inches wide. The parts are loaded onto a motorized stage that passes the parts underneath the spray head. The weight laydown can be varied by adjusting the speed of the stage up or down until a dry-fired coating of desired weight is obtained.

The interconnect with "wet" heat transfer layer is then placed in a kiln and fired. The kiln is programmed to ramp the temperature at a rate of 145° C./hr up to 750° C., hold at 750° C. for an hour, and then ramp down at a rate of about 90.6° C. to room temperature.

This procedure provides a well-bonded silver heat transfer layer on the surface of the interconnect. Procedures for other metals can be formulated without undue experimentation.

Anode seal 39 and cathode seal 45 form gas-tight seals between the respective areas of the electrolyte plate and the interconnect when the stack is assembled. The gas tight seals maintain product gas purity and prevent product loss, and prevent or minimize the mixing of feed and product streams. The seals prevent or minimize gas mixing due to pressure differential and/or gas composition differential among the feed, permeate, and nonpermeate streams. The gas-tight seals also serve to bond the electrolyte plates and interconnects together in the stack. The seals can be cofired and bonded directly to the electrolyte plates and interconnects, or alternatively one or more additional cofired materials can be used.

A preferred material for seals 39 and 45 is a glass-ceramic derived from a lithium aluminosilicate (LAS) glass, which is a material known in the art for use in seals as described for example in an article by T. J. Headly and R. E. Loehman entitled "Crystallization of a Glass-Ceramic by Epitaxial Growth" in Journal of the American Ceramic Society, Vol. 67, pp. 620-625, 1984.

Figure 6:
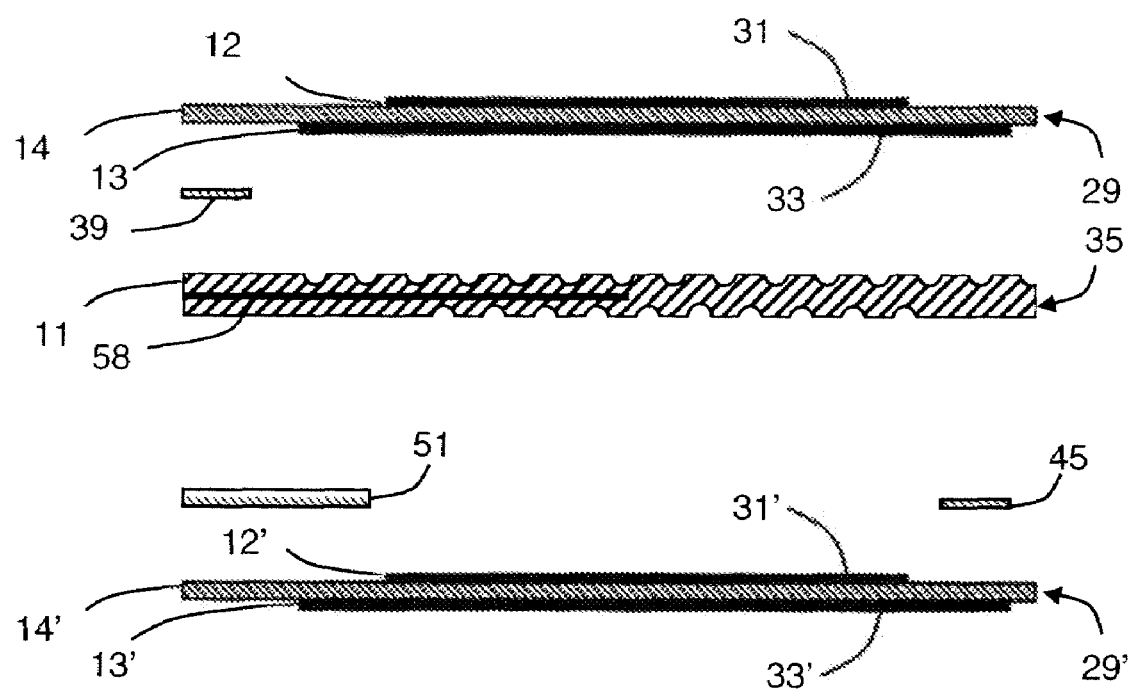
FIG. 6 is an exploded section view in cross section of an alternative embodiment of the current invention.

An exploded view of another embodiment is illustrated in FIG. 6, showing a layer 58 formed within the interconnect. In this embodiment, the layer is shown to extend only part way through the interconnect. The interconnect can be formed by including a plurality of silver ribbons, rods, bars, and the like, when forming the interconnect to create a composite-like structure. Numbered features in FIG. 6 represent correspondingly numbered features in FIG. 5.

In this case the means for conducting heat is between the outer edge 13 of the anode 33 and the outer edge 11 of the interconnect 35. It is possible to draw a straight line from the outer edge 13 of the anode 33 to some point on the outer edge 11 of the interconnect 35 where the line passes through or intersects with the means for conducting heat. The means for conducting heat is also between the outer edge 12' of the cathode 31' and the outer edge 11 of the interconnect 35. It is possible to draw a straight line from the outer edge 12' to some point (above the means for conducting heat 58) on the outer edge 11 where the line passes through or intersects with the means for conducting heat.

Air and oxygen gas passages may be fabricated within the interconnect in a wide variety of shapes, in cross-section, such as rectangular, trapezoidal, semi-circular and the like. The depth and spacing of the passages may be widely varied and optimum designs may be assessed for a given application without undue experimentation. For example, the depth of a passage may decrease with distance traversed across the surface of the electrode layer in order to increase the diffusional flux to the electrode surface of the component gas being transported through the electrolyte.

The following example is provided to illustrate the invention and is not intended to restrict the scope thereof.

EXAMPLE

Silver Layers on Cathode Side of Interconnect

Figure 7:
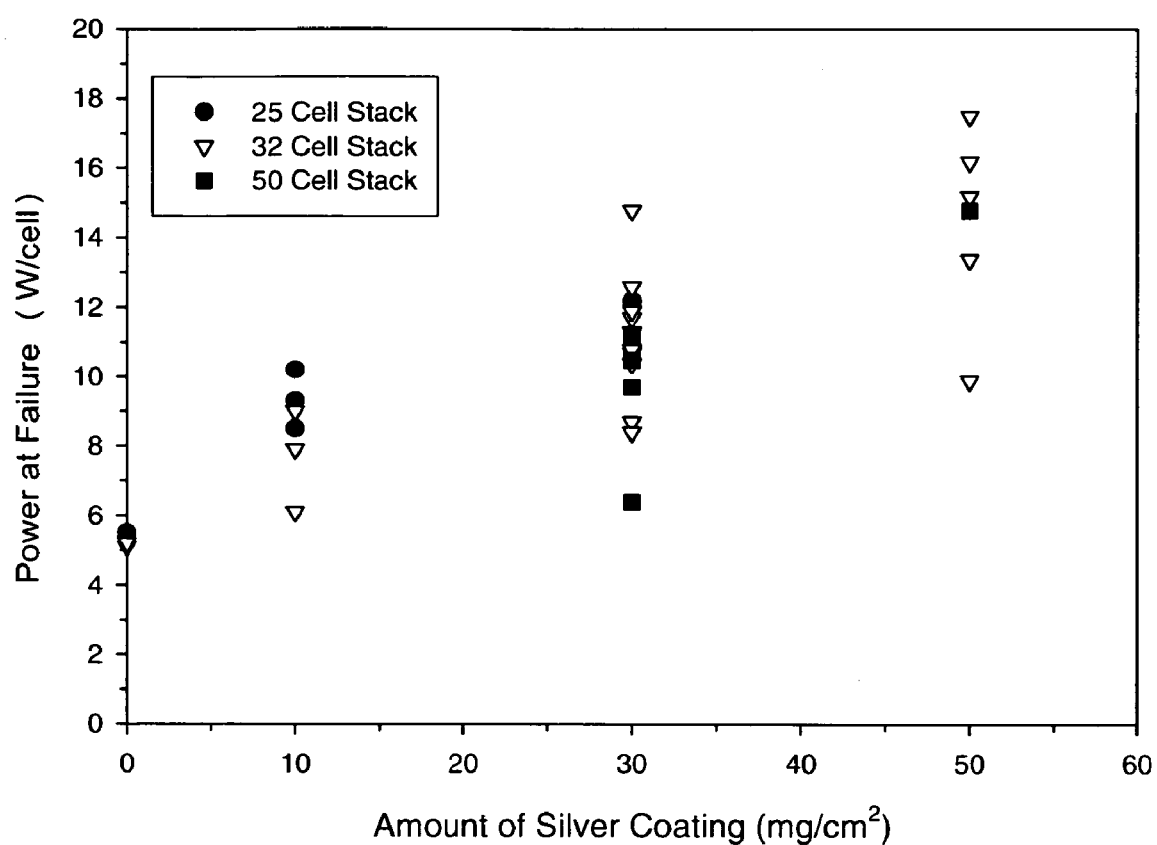
FIG. 7 is a graph illustrating the effect of the invention on maximum power capacity of multi-cell stacks.

FIG. 7 illustrates the beneficial impact of the means for conducting heat toward the outer edge of the interconnect. All of the stacks had silver conformal layers present in the pin region, including the cases with 0 mg/cm$^2$. Stacks having 25, 32, and 50 cells were tested where average amounts of silver coating was varied (0, 10, 30 and 50 mg/cm$^2$). For each case (datum point), all of the cells in the stack had the same amount of silver coating.

The silver layer was applied to the cathode side of a number of interconnects and was applied by the spray coated/kiln fired method described herein. FIG. 7 shows the maximum power resulting in failure of the device versus the amount of silver applied to each interconnect. A break or crack in the electrolyte plate resulted in loss of oxygen product and hence in failure of the device.

Although there is scatter in the data, the data clearly show an increased power capability with the addition of the silver heat transfer layer. The scatter may be due to variability in the electrolyte plates or other components, especially the uniformity of the enhanced heat transfer layer. Increased power capability is translated into increased current capability according to P=Vi, where P is power, V is applied voltage potential, and i is current.

Since oxygen production is directly proportional to the current according to $F=N_c i (0.00375)$, where F is oxygen flow in standard liters per minute, $N_c$ is number of electrochemical cells, i is current in amps, the increased power capability represents a higher oxygen productivity for a given cell size.

The present invention has been set forth with regard to several preferred embodiments, however, the full scope of the present invention should be ascertained from the following claims.

What is claimed is:

1. An electrochemical device comprising:
   (a) a first solid electrolyte having an anode side, a cathode side and an outer edge;
   (b) a first anode situated adjacent to the anode side of the first solid electrolyte, the first anode having an outer edge wherein the outer edge of the first anode is offset from the outer edge of the first solid electrolyte;
   (c) a first cathode situated adjacent to the cathode side of the first solid electrolyte, the first cathode having an outer edge wherein the outer edge of the first cathode is offset from the outer edge of the first solid electrolyte;
   (d) a second solid electrolyte having an anode side, a cathode side and an outer edge;
   (e) a second anode situated adjacent to the anode side of the second solid electrolyte, the second anode having an outer edge wherein the outer edge of the second anode is offset from the outer edge of the second solid electrolyte;
   (f) a second cathode situated adjacent to the cathode side of the second solid electrolyte, the second cathode having an outer edge wherein the outer edge of the second cathode is offset from the outer edge of the second solid electrolyte;
   (g) an electrically-conductive, non-ionically conductive ceramic interconnect having no connected through porosity situated between said first solid electrolyte and said second solid electrolyte, said interconnect having an anode side, a cathode side, and an outer edge; and (h) a layer located between the outer edge of the interconnect and at least one of the outer edge of the first anode, the outer edge of the first cathode, the outer edge of the second anode, and the outer edge of the second cathode, said layer comprising at least one metal selected from the group consisting of silver, gold, platinum, rhodium, and palladium;

wherein the layer is in physical contact with at least 75% of at least one of the anode side of the interconnect and the cathode side of the interconnect.

2. The electrochemical device of claim 1 wherein the layer consists essentially of a metal selected from the group consisting of silver, gold, platinum, rhodium, palladium, and mixtures thereof.

3. An electrochemical device which comprises:

(a) an electrically-conductive, non-ionically conductive ceramic interconnect having no connected through porosity, the interconnect comprising:
  i) an anode side having a continuous peripheral flat surface adjacent to an outer surface,
  ii) a cathode side having a continuous peripheral flat surface adjacent to the outer surface, and
  iii) the outer surface connecting the anode side and the cathode side at an outer periphery; and (b) a layer comprising at least one metal selected from the group consisting of silver, gold, platinum, rhodium, and palladium, wherein the layer is at least one of:
  i) in physical contact with at least a portion of the continuous peripheral flat surface of the cathode side,
  ii) in physical contact with at least a portion of the continuous peripheral flat surface of the anode side, and
  iii) between at least a portion of the continuous peripheral flat surface of the anode side and the continuous peripheral flat surface of the cathode side.

4. The electrochemical device of claim 3 wherein the layer consists essentially of a metal selected from the group consisting of silver, gold, platinum, rhodium, palladium, and mixtures thereof.

5. The electrochemical device of claim 3, wherein the layer is in physical contact with at least 75% of the anode side of the interconnect.

6. The device of claim 3, wherein the layer is in physical contact with at least 75% of the cathode side of the interconnect.

7. The electrochemical device of claim 1 wherein the outer edge translocated about an outer periphery of the interconnect forms an outer surface of the interconnect connecting the anode side of the interconnect and the cathode side of the interconnect at the outer periphery.

* * * * *